United States Patent [19]
Lantto

[11] Patent Number: 5,867,784
[45] Date of Patent: *Feb. 2, 1999

[54] CALL FORWARDING IN A MOBILE COMMUNICATION SYSTEM

[75] Inventor: S. Jörgen Lantto, Stockholm, Sweden

[73] Assignee: Telefonaktiebolaget LM Ericsson, Stockholm, Sweden

[*] Notice: This patent issued on a continued prosecution application filed under 37 CFR 1.53(d), and is subject to the twenty year patent term provisions of 35 U.S.C. 154(a)(2).

[21] Appl. No.: 498,410

[22] Filed: Jul. 5, 1995

[51] Int. Cl.$^6$ .................................. H04Q 7/20; H04Q 7/22
[52] U.S. Cl. .......................... 455/432; 455/414; 455/436; 379/211
[58] Field of Search ...................................... 375/222, 377, 375/200, 211; 370/85.13, 26, 68.1, 315, 327, 330, 331; 455/33.4, 56.1, 422, 432, 436, 445, 524, 560, 414, 416, 417; 379/58, 59, 60, 210–212

[56] References Cited

U.S. PATENT DOCUMENTS

| 5,119,397 | 6/1992 | Dahlin et al. . |
| 5,142,654 | 8/1992 | Sonberg et al. . |
| 5,291,544 | 3/1994 | Hecker . |
| 5,428,665 | 6/1995 | Lantto . |
| 5,608,779 | 3/1997 | Lev et al. .................................. 379/58 |

FOREIGN PATENT DOCUMENTS

| 0 332 345 | 9/1989 | European Pat. Off. . |
| WO92/22174 | 12/1992 | WIPO . |

OTHER PUBLICATIONS

J. Lantto, "Intelligen Network Architecture in the Japanese Digital Cellular Standard—PDC", Ericson Review, No. 3, pp. 145–149 (1994).

CCITT Signalling System No. 7, ITU–T Recommendations Q.771–Q.775 in CCITT's "Blue Book".

"Internode Specifications for Digital Mobile Communications Network," TTC JJ70.10, ver. 3.2, pp. 300, 343–345, 383–389, 428–435, 444, 472, 485, 486, 491, 564, 565.

CCITT "Blue Book", Fascicle VI.11, Digital Subscriber Signalling System No. 1 (DSS1), Network Layer, User–Network Management, pp. vii–ix, 3–8, 15, 16, 23, 30, 31, 46, 47, 67–75, 112, 116, 151, 365–378.

Syuji Yasuda et al., "Network Functions for the Application of Multi–rate Speech Coding in Digital Cellular Systems", *IEEE Proceedings of the Vehicular Technology Conference*, Stockholm, vol. 1, pp. 306–310 (Jun. 8, 1994).

*Primary Examiner*—Curtis A. Kuntz
*Assistant Examiner*—Nay Maung
*Attorney, Agent, or Firm*—Burns, Doane, Swecker & Mathis, L.L.P.

[57] ABSTRACT

A digital cellular communication system supports call forwarding with better speech quality by avoiding unnecessary speech decoding when a call is forwarded from one network or exchange to another. A new information element that contains the network code of an originating mobile services switching center (MSC) is added in an initial address message, so that the address of the originating MSC can be properly determined by a terminating MSC or, if call forwarding has been initiated, by a forwarded-to MSC. A structured dialog is used for sending a speech coding request to the originating MSC in which a return result signal acknowledging the request is sent to the correct receiver in the terminating MSC or, if call forwarding has been initiated, in the forwarded-to MSC.

9 Claims, 6 Drawing Sheets

(NO CALL FORWARDING)

(CALL FORWARDING INVOKED)

(CALL FORWARDING INVOKED)

| 8 | 7 | 6 | 5 | 4 | 3 | 2 | 1 |
|---|---|---|---|---|---|---|---|
| 1 | ODD/EVEN | NUMBER TYPE | | | | | |
| 2 | NI | NUMBERING PLAN | | | PRESENTATION RESTRICTION | | SCREENING INDICATOR |
| 3 | MSC ADDRESS | | | | | | |
| n | FILLER (IF NECESSARY) | | | | N-TH ADDRESS | | |

CALL FORWARDING IN A MOBILE COMMUNICATION SYSTEM

BACKGROUND

Applicant's invention relates to a system providing supplementary services and transcoder control procedures for handling traffic between subscribers in a communication network. The invention more particularly relates to a system for providing call forwarding services to digital mobile subscribers in a digital cellular radiotelephone system.

A cellular radiotelephone system typically comprises a network of neighboring radio cells that together provide complete coverage of a geographic area to be serviced. Each cell has a base station (BS) that communicates with one or more mobile stations (MSs) through associated radio channels. A set of radio channels assigned to a given cell is different from the sets used in neighboring cells in order to avoid interference. Groups of BSs are controlled by respective mobile services switching centers (MSCs), each of which is equivalent to a local exchange in the public switched telephone network (PSTN). Thus, an MSC is responsible for handling tasks such as switching, routing, and charging calls and communications to and from the PSTN and other networks.

Well known cellular systems such as the Nordic Mobile Telephone (NMT) system; Total Access Communication System (TACS); Advanced Mobile Phone System (AMPS); American Digital Cellular (ADC) system; Global System for Mobile Communication (GSM); and Personal Digital Cellular (PDC) system (formerly called the Japanese Digital Cellular (JDC) system) have all adopted standardized techniques for providing basic and supplementary services to roaming subscribers. As used in this application, the term "basic service" refers to the ability of a communication network simply to establish a call and to those services, such as three-party calling, which are available to all subscribers without requiring individualized subscription. The term "supplementary services" refers to those capabilities, in mobile as well as fixed networks, that go beyond "basic" services and that require individual subscription before those services can be invoked.

Individual supplementary subscriber services may be divided into two types: those that modify or supplement the process of originating a call (referred to here as "A-subscriber services"); and those that modify or supplement the process of terminating a call (referred to here as "B-subscriber services"). A-subscriber services include, but are not limited to, barring of outgoing calls and private numbering plans. B-subscriber services may be broken down into those that are invoked unconditionally, i.e., regardless of the status of the called subscriber or the network, and those whose invocation depends on a particular status or condition being present at the subscriber or in the network. Unconditional B-subscriber services include, but are not limited to, barring of incoming calls and unconditional call forwarding. Conditional B-subscriber services include call forwarding on busy, call forwarding on no reply, call forwarding on congestion, and call waiting.

Various ones of the operations involved in providing basic and supplementary services are described in U.S. patent application Ser. No. 08/115,589 filed Sep. 3, 1993, by Lantto et al. for "Method and System for Providing Supplementary Services to a Mobile Station"; U.S. patent application Ser. No. 08/141,086 filed Oct. 26, 1993, by Lantto for "Receiving Subscriber Data from HLR in GSM MSC/VLR"; U.S. patent application Ser. No. 08/141,094 filed Oct. 26, 1993, by Lantto for "Method of Managing Supplementary Service Procedures in GSM/VLR towards HLR"; U.S. patent application Ser. No. 08/182,834 filed Jan. 19, 1994, by Widmark et al. for "Providing Individual Subscriber Services in a Cellular Mobile Communications Network"; and U.S. patent application Ser. No. 08/249,989 filed May 27, 1994, by Lantto et al. for "Method for Handling Calls to a Non-Registered Mobile Subscriber in a Mobile Telephone System".

To keep track of the MSs, a data base called a home location register (HLR) may be provided as a node in the mobile radio communication network. When a user (MS) subscribes to receive service from an operator, subscriber information such as the supplementary service(s) selected by the user is entered in that operator's HLR. Also, the HLR stores information about the location of the MS, including information identifying the MSC serving the MS's current location. This information is updated as the MS moves around by having the MS send location information to its HLR by means of an MSC. Thus, when an MS roams into a new MSC area, it registers with that MSC, which then requests data about the MS from the HLR and informs the HLR of the MSC area in which the MS is currently located.

The HLR typically plays a part in managing individual supplementary subscriber services in that, in addition to storing the current location of a roaming subscriber, the HLR may also store subscriber categories and call forwarding numbers (called "C-numbers"). The HLR updates subscriber category information and C-numbers in its memory when requested to do so by an authorized terminal. The HLR transmits selected parts of this information to an interrogating MSC on the occasion of registration of a roaming MS, and to a gateway MSC (GMSC) on the occasion of call to a MS, as explained in more detail below.

In a typical network, A-subscriber services and conditional B-subscriber services are provided by the MSC, based on the subscriber categories provided to the visitor MSC (VMSC) by the HLR at the time of registration. Unconditional B-subscriber services are invoked by the HLR because a call to a MS always means that the first MSC contacted (i.e., the GMSC) consults the HLR in order to learn the whereabouts of the subscriber. Thus, the HLR is in the best position to handle unconditional services such as sending to the GMSC the C-number to which the call is to be unconditionally forwarded.

In order to standardize communication between HLRs and MSCs, cellular radiotelephone systems have adopted the Mobile Application Part (MAP) and Translation Capabilities Application Part (TCAP) of the communications protocol known as CCITT Signaling System No. 7. Somewhat different variants of the MAP and TCAP protocols are used with the different cellular standards (GSM, ADC, PDC, etc.). The MAP provides the signalling procedures for communication between MSs. The network part of PDC is described in the standard Internode Specifications for Digital Mobile Communications Network, TTC JJ70.10, Ver. 3.2.

According to various exemplary embodiments of Applicant's invention, existing signalling channels of a radio communication system are used to transmit simple request messages related to a particular subscriber-initiated supplementary service that is desired by a mobile subscriber. The request signalling for such a service from the MS to the network, as well as the confirmation signalling from the network to the MS indicating whether or not this service request has been complied with, are transmitted over Layer 3. "Layer 3" is a term that defines where, and in which logical channels, a particular message is transmitted and received. Layer 3 is described, for example, in Recommendation Q.930 in CCITT's "Blue Book", Fascicle VI. 11, "Digital Subscriber Signalling System No. 1 (DSS 1), Network Layer, User Network Management".

A communication system may be considered as having at least three layers. Layer 1 is the physical layer, which defines the parameters of the physical communication channel, e.g., radio frequency spacing, carrier modulation characteristics, etc. Layer 2 defines the techniques necessary for the accurate transmission of information within the constraints of the physical channel (Layer 1), e.g., error correction and detection, etc. Layer 3 defines the procedures for transparent transfer of information over the Layer 2 data link layer.

The specific hardware implementations of radio communication systems are beyond the scope of the discussion here, but those skilled in the art will readily appreciate that this invention can be applied to any such system where signalling for supplementary services occurs between a mobile or portable station and a network. One example of a radio communication system is a cellular communication network in which an MSC is connected between a PSTN and one or more BSs that transmit and receive signals from the MSs. When a call is connected, communication takes place over a traffic channel, whereas the initial connection of a call and transfer of a call from one BS to another typically takes place over a control channel. The specification of such traffic and control channels can be according to the applicable standard for the system being implemented, e.g., GSM, ADC, PDC, etc. For those interested in an exemplary hardware configuration of such base and mobile stations, U.S. Pat. No. 5,119,397 to Dahlin et al. is incorporated here by reference.

As new supplementary services are developed, they can be quickly incorporated by use of a network definition known as Intelligent Network (IN). The idea of IN is to provide intelligent nodes (I-nodes) in the network that may be consulted by other nodes in the network and updated from other nodes. I-nodes are data processing equipment connected to other nodes only through data links for signaling; I-nodes do not have switched user connections for speech or for user data transfer. Consequently, they may be accessed via data links only from particular other nodes in the network, such as service switching points (SSPs) in the PSTN.

New services are introduced by adding new program modules in the I-nodes, each corresponding to an IN functional entity. For example, a services control point (SCP) is the node in the network where most of the service logic resides, and an SSP is the node that handles the switching functions necessary to enable the services invoked by the SCP. These nodes correspond to functional entities which have been defined by the IN standards presented in CCITT Recommendation Q.1218. A service data function (SDF) is also implemented in the SCP that stores the service data needed for the SCF. Communication between the SSF and the SCF (and between the SSP and the SCP) is carried out in accordance with a protocol called the Intelligent Network Application Part (INAP), which is also) part of CCITT No. 7.

IN solutions in the fixed network environment achieve rapid introduction of new services as a result of the functional division between the SCF and the SSF, in which the complete individual service logic resides in the SCF, and the SSF only performs generic switching functions (e.g., monitoring and reporting call events; setting up new legs; and disconnecting legs) under the direction of the SCF. The IN solution cannot also be applied to the cellular environment because of the conflict between the operation strategies of the SCF and the HLR, the SDF and the HLR, and the SSF and the MSC. The SCF performs the same functions as the HLR, but it uses a different implementation and different interfaces. The same may be said of the SDF and the HLR, as well as the SSF and the MSC.

For example, the SCF is meant to control all services in an intelligent network, but this arrangement is violated by the cellular standards that always require the HLR to contain the information necessary for invoking services such as unconditional call forwarding and barring of incoming calls. Similarly, the SDF serves as the subscriber data storage function in the intelligent network, but the HLR always stores subscriber data in a cellular network.

In a digital cellular phone network, speech is sent in digital form between terminals, e.g., from an originating digital MS to a phone in the PSTN or to another MS. An input analog speech signal at a digital MS is converted into digital form according to a speech coding algorithm that conforms to the applicable standard. The PDC system uses a speech coding algorithm that is a member of a class of speech coders known as code-excited linear predictive (CELP) coders, or vector-sum-excited linear predictive (VSELP) coders. A VSELP coder converts an analog speech signal into a digital speech signal, taking into account the expected frequency and amplitude distribution of the human voice. In this way, it is possible to compress a speech bandwidth of 3.1 kilohertz (kHz) into only 6.7 kilobits per second (kb/s), which is much less than the 64 kb/s that would be necessary if normal pulse code modulation (PCM) were used. On the other hand, such coded speech cannot be used by others without converting the coded signal into normal digital speech using a device called a transcoder, or codec.

Besides speech coding, many systems also use channel coding. For example, a PDC channel coder encodes the digital speech signal with redundant information according to block and convolutional codes for detecting and correcting transmission errors. The PDC channel coder takes VSELP digital speech having a rate of 6.7 Kb/s and converts it to a channel-coded signal having a rate of 11.2 Kb/s, which can be passed unrestricted through the network, e.g., from one MSC to another, over a 64-Kb/s channel. It will be appreciated that 11.2 Kb/s is full-rate transmission; half-rate transmission (5.6 Kb/s) of a channel coded signal derived from digital speech from a PSI-CELP speech coder can also be used.

In a call between two digital MSs, correct transcoder control procedures used to handle traffic are only obtained if the Integrated Services Digital Network User Parts (ISUP) and I-node map procedures are guaranteed end to end, i.e., if the call remains completely within the PDC network at all times. In such a case, both the originating and terminating subscribers are connected to an 11.2-Kb/s VSELP-speech- and channel-coded connection. Theoretically, it is possible to convert the 11.2-Kb/s speech-and channel-coded information up to a 64 Kb/s call at the originating MS, and then convert the information back again at the terminating MS. In practice, the speech quality is reduced, so it is necessary to synchronize both speech coders to one another and set them to a "codec-through connect" mode.

FIG. 1a depicts the transcoders in a "codec-through connect" mode. Reference characters A, B, and C represent 11.2-Kb/s VSELP-speech- and channel-coded calls. Reference characters D and F represent signalling connections from MS-A to MSC-A and from MS-B to MSC-B, respectively. Reference character E represents an ISUP signalling connection. Reference character G represents a MAP signalling connection.

FIG. 1b depicts a signalling diagram for a call between two digital MSs. Referring to FIG. 1b, the originating MSC receives a SETUP message from the calling MS and orders an analysis of the called party number. The transcoder will set to "speech" at the originating MSC regardless of whether or not a "Call to MS" result is obtained. This is important so that it is possible to hear any tones or announcements that occur and also handle the case when call forwarding occurs.

Within the ISUP, the messages contain additional information regarding the mobile specific data. An initial address message (IAM) contains a transmission medium requirement (TMR) or unrestricted digital information, as well as information representing transfer capability, including whether "speech" or "speech and data" can be transferred, whether the data is 11.2-Kb/s or VSELP coded, and whether the coding standard is the standard defined for the network. The IAM also contains call reference (CR) information, identifying the call in the originating MSC and the signalling point code (SPC) of the originating MSC, and network code (NC) information, identifying the originating network.

Upon reception of the IAM, the terminating MSC pages the called MS and allocates a CR. The terminating MSC returns its CR and SPC in an address complete message (ACM). The originating MSC receives the ACM and stores the CR value from the ACM. The SPC from the ACM is discarded, and the terminating MSC's SPC is obtained instead from a codec setup request (CODEC SET REQ) message that is sent to request the through-connection. At this point, the terminating MSC has sufficient information to initiate the MAP communication with the originating MSC, but the originating MSC does not have enough information to begin such a communication before receiving a message from the terminating MSC.

The terminating call proceeds as normal until the reception of a connect (CONN) message from the MS. At this point, call setup is halted while the transcoder control procedures are initiated. From an analysis of the received IAM and user service information, the terminating MSC recognizes that the call is coming from another digital MS and sets its transcoder to the "codec-through connect" mode. The terminating transcoder then begins to send speech and synchronization (SS) frames. Using the SPC, NC, and CR received in the IAM, the terminating MSC sends the MAP CODEC SET REQ message to request the originating transcoder to switch to "codec-through connect" mode. A timer TCodec, awaiting a codec set acknowledge (CODEC SET ACK) message, is started in the terminating MSC.

Upon reception of the CODEC SET REQ message in the originating MSC, the originating transcoder begins to send SS frames on the speech circuit. When this has been done, the originating MSC sends the CODEC SET ACK message back to the terminating MSC using the CR stored earlier and the SPC and NC received in the CODEC SET REQ message. Upon reception of the CODEC SET ACK message, call setup continues with the sending of an answer message (ANM). If the CODEC SET ACK message is not received before Tcodec expires, then the call is released by the terminating MSC. The MAP messages are sent directly between the terminating and originating MSCs using the SPCs, NCs, and CRs sent during the call setup phase.

In a standard PDC network as depicted in FIG. 2, an originating MSC, denoted as MSC-A, is in radio contact with an originating digital MS, denoted as MS-A, that includes a speech coder and a channel coder. A call originated by MS-A is set up from the MSC-A to a terminating MSC, denoted as MSC-B, through a link or connection 10; the MSC-B is in radio contact with a terminating digital MS, denoted as MS-B, that also includes a channel decoder and a speech decoder. The MSC-A uses a MAP interface to ask the HLR about the current location of the MS-B, and to receive that MS-B's roaming number, which the MSC-A uses to route the call to the MS-B through the connection 10 and the MSC-B. FIG. 2 shows the typical situation when call forwarding is not invoked by the MS-B, so the network operates in the "codec-through connect" mode and VSELP or CELP data passes through the connection 10, as Layer 1 data.

The predetermined information elements in the PDC-standard signaling messages do not fully accommodate transcoder control procedures and some supplementary services. For example, the transcoder control procedures specified for the PDC system are inadequate for the traffic case when a terminating MS has forwarded calls to another digital MS.

This situation is illustrated in FIG. 3. When a call-forwarding service is invoked in MSC-B, a logic device in the MSC-B causes it to read in its category store (which was updated from the HLR through a MAP interface when the MS-B roamed into the region served by the MSC-B) that MS-B has forwarded calls to a particular C-number given in the store. In response to this situation, the MSC-B routes the call to a forwarded-to digital MS-C having the C-number through a connection 12 and a forwarded-to MSC, denoted as MSC-C, thereby completing the supplementary service.

When such a call is forwarded, it is difficult for the forwarded-to exchange MSC-C to identify the originating exchange MSC-A and to identify the originating CR information. In order for a terminating MSC of a digital MS to address the originating MSC of another digital MS, not only the SPC but also the network identity of the originating MSC must be determined by the terminating MSC. In the current PDC standard's specification of the I-node, the terminating MSC derives the network identity of the originating MSC from the "charge area" information included in an IAM sent from the originating MSC to the terminating MSC. In particular, the network identity of the originating MSC is derived from the NC data and message area (MA) data in the IAM.

Nevertheless, in the traffic scenario illustrated in FIG. 3 the "Charge Area" information element of the IAM sent by the MSC-B cannot be used by the MSC-C to derive the network identity of the originating MSC-A because the forwarding leg is independent. Thus, the "Charge Area" information in the IAM sent by the MSC-B to the MSC-C relates to the forwarding subscriber MS-B, not the subscriber MS-A originating the call.

Moreover, as illustrated in FIGS. 3 and 4, when call forwarding is initiated, the codec setup request message to request speech and channel coding will not reach its final destination, MSC-A, since the SPC data in the IAM is used to address the MSC-A and the NC data in the IAM is used to address the MSC-B. The reason for this is the forwarding subscriber MS-B is charged for the forwarding leg of the call. Furthermore, since the forwarding MSC-B may belong to a network that is different from the network of the originating MSC-A, call forwarding may be impossible to handle with the transcoder control procedures of a single network.

The other above-mentioned problem for call forwarding is call referencing under the ISUP for communication between different exchanges and networks. According to the PDC standard and the current I-node specification in the ISUP, the terminating MSC-B sends an address complete message (ACM) to the originating MSC-A. The ACM message includes the SPC of the terminating MSC-B, as well as a CR allocated by the MSC-B. The parameters SPC and CR are used by the MSC-A when sending the codec setup acknowledge message to the MSC-B to confirm that the request for speech and channel coding has been received.

As illustrated in FIG. 5, if the subscriber MS-B forwards calls to another digital MS in contact with the MSC-C, the SPC and CR stored in the originating MSC-A will still be those of the (formerly) terminating MSC-B. Since the MSC-C is the terminating MSC of the forwarded call, the codec setup acknowledge message that is sent from the MSC-A to the MSC-C contains the CR of the MSC-B instead of the CR of the MSC-C. In other words, the CR of the codec setup request message does not correspond to the CR of the codec setup acknowledge message. Since no response will be received in the MSC-C with the CR allocated by the MSC-C, the timer started in the MSC-C to accommodate the call will elapse, the setup procedure will be unsuccessful, and the call will be released.

As shown in FIG. 3, VSELP or CELP data is decoded in the MSC-A and passes through connection 10, MSC-B, and connection 12 as ordinary PCM data. The MSC-C then re-codes the information using both speech and channel coding and passes the re-coded information to the MS-C. In CELP/VSELP coding, only analog speech signals must be provided to a speech coder, i.e., two coders should not be connected in tandem. Thus, the conventional PDC standard provides that the forwarding leg between the MSC-B and the MSC-C and MS-C is established as an independent call: the MSC-A decodes the speech data for transmission to the MSC-C, which re-codes it for transmission to the MS-C. To forward a call, the forwarding MSC changes the TMR to either "speech" or 3.1 kHz audio. When a call is forwarded, both subscribers will have a transcoder connected in "speech" mode which may lead to a loss in speech quality. The result of this extra decoding/coding is reduced speech quality because CELP/VSELP coding trades speech quality for lower bit rate.

SUMMARY

With Applicant's invention, unnecessary speech decoding in the current PDC standard network is avoided when a call is forwarded from one digital terminal or network to another. Applicant's call forwarding solution overcomes two shortcomings of the current PDC standard: it provides for identifying the originating exchange and the originating call reference when a call is forwarded from one digital network to another.

It is therefore an object of Applicant's invention to avoid unnecessary speech and channel coding and decoding when a call is forwarded from one digital network to another.

It is therefore yet another object of Applicant's invention to enable existing digital network standards to support call forwarding operations while improving speech quality.

In accordance with Applicant's invention, these and other objects are achieved by providing accurate network identification and call referencing during a call forwarding operation. Positive network identification is realized through the use of a new information element which contains the network code of the originating MSC, which will not be changed during call setup in the network, even when call forwarding is invoked. Accurate call referencing is realized through the use of Transaction Capability Application Part (TCAP) services which assure that a return result from the originating MSC, acknowledging the codec setup request message, will always be sent to the correct terminating MSC.

DETAILED DESCRIPTION

Call forwarding presents special problems for transcoder control in a network that are solved by Applicant's invention. For illustrative purposes, an originating MSC is denoted as MSC-A; an MSC that forwards a call is denoted as MSC-B; and an MSC to which calls have been forwarded is denoted as MSC-C. The invention is not restricted to the use of these labels, however, but applies to any type or number of network components involved in a call forwarding operation.

Figure 1A:
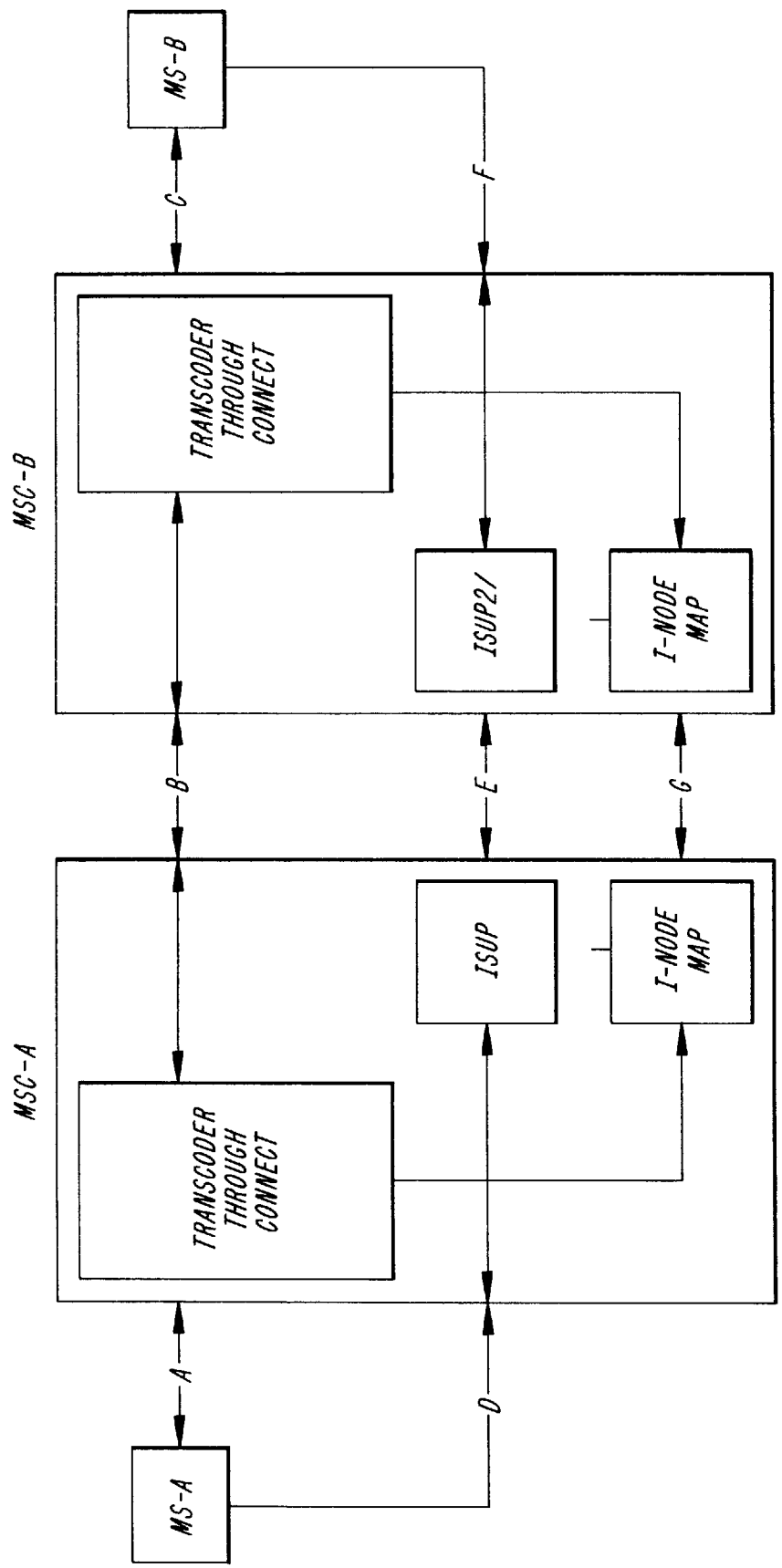
FIGS. 1a, 1b illustrate a conventional call setup between mobile stations.
Figure 1B:
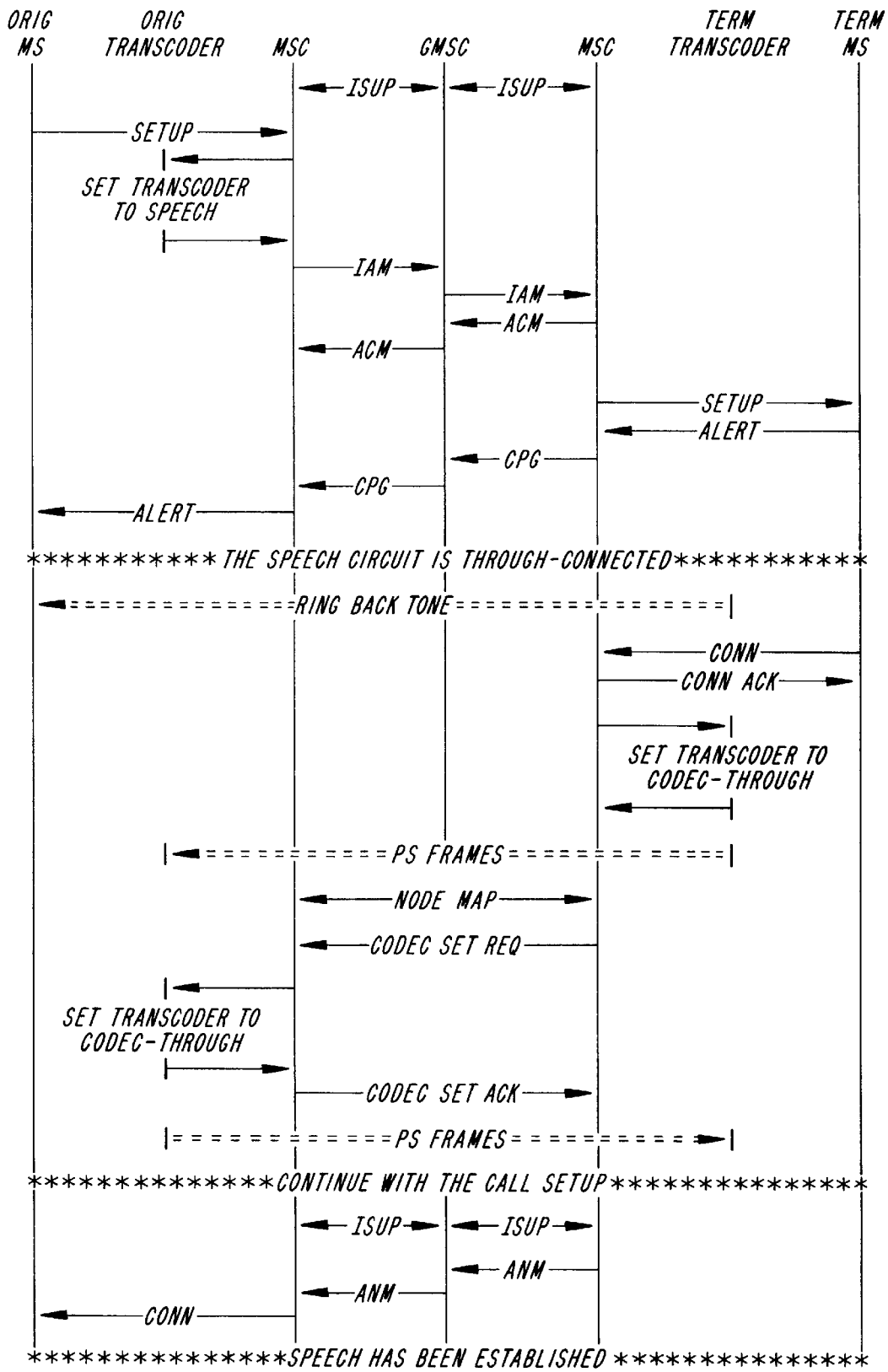
Figure 2:
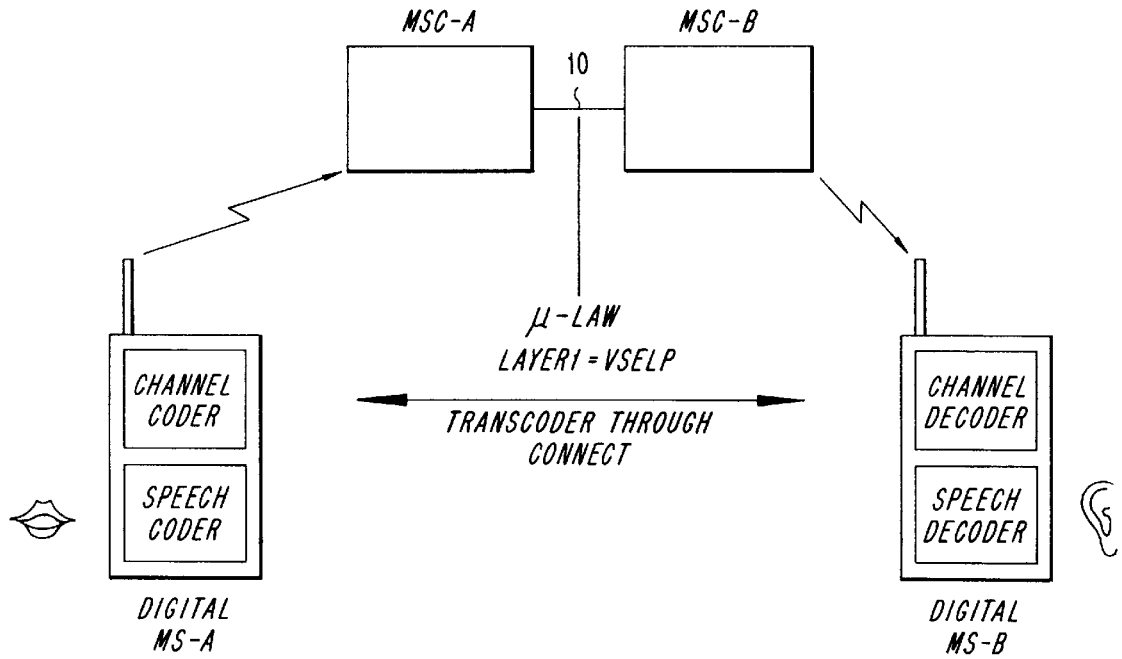
FIG. 2 illustrate call routing in a conventional mobile communications network without invocation of a call-forwarding supplementary service.
Figure 3:
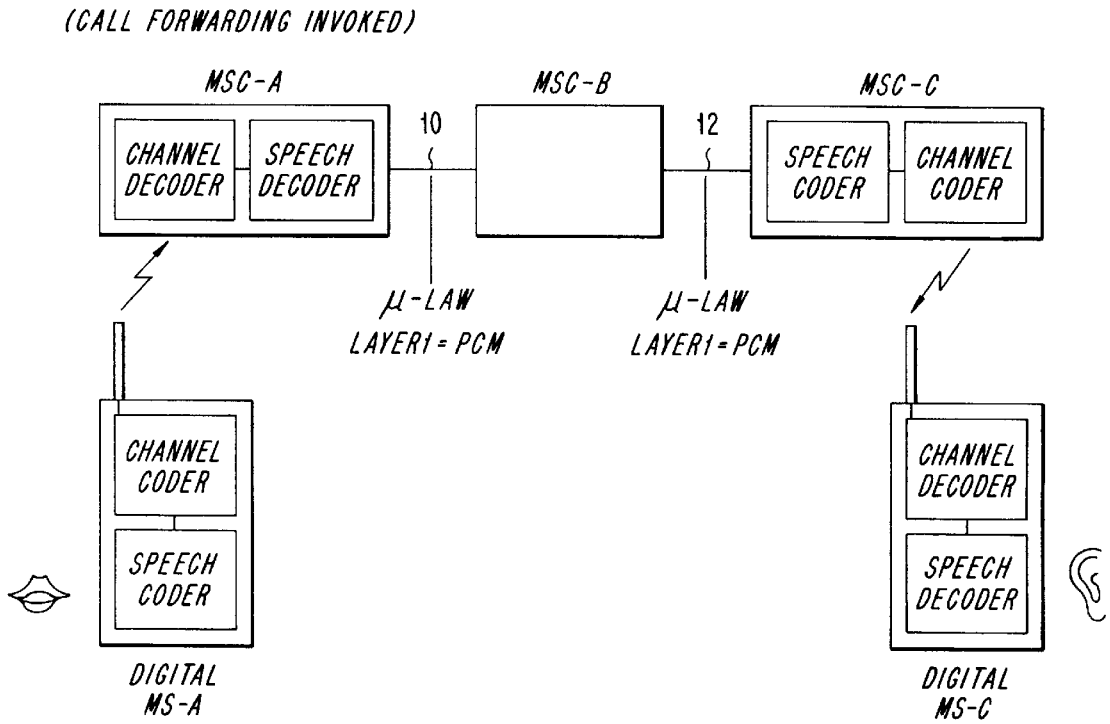
FIG. 3 illustrates a call-forwarding supplementary service in a mobile communications network.
Figure 4:
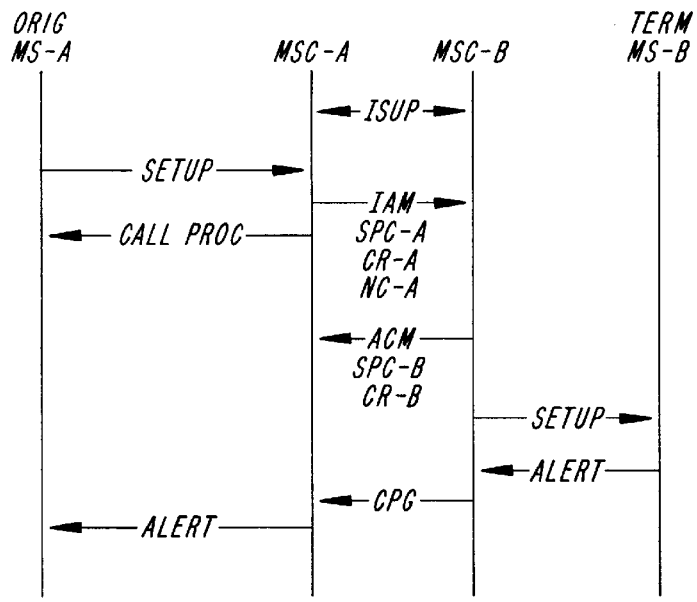
FIG. 4 shows network messaging sequences in the case of call forwarding.
Figure 4:
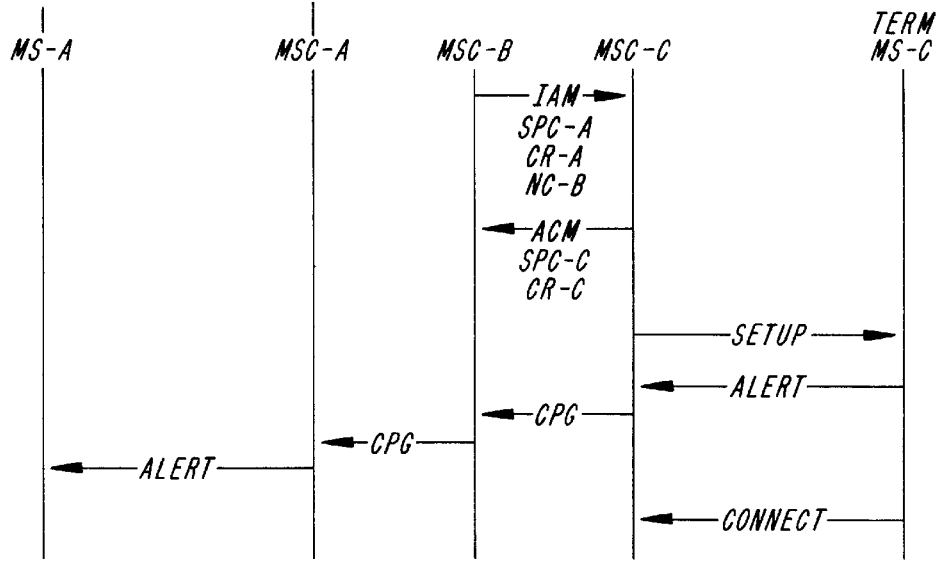
Figure 4:
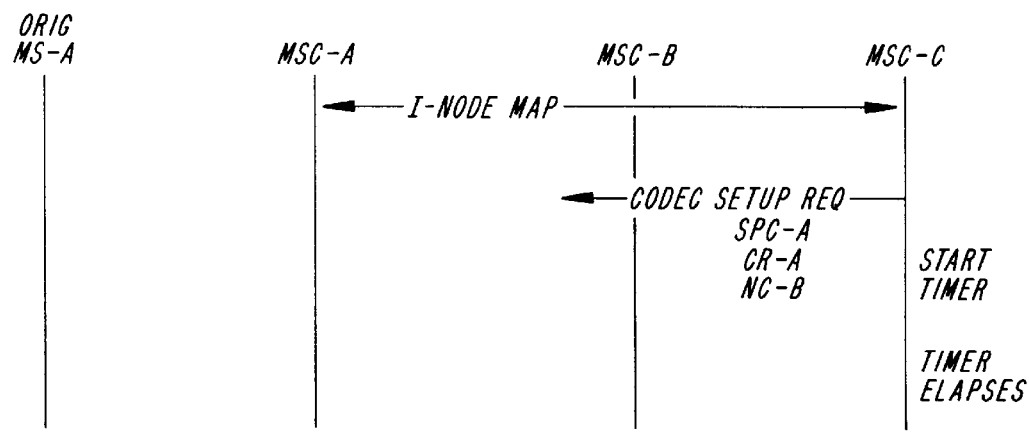
Figure 5:
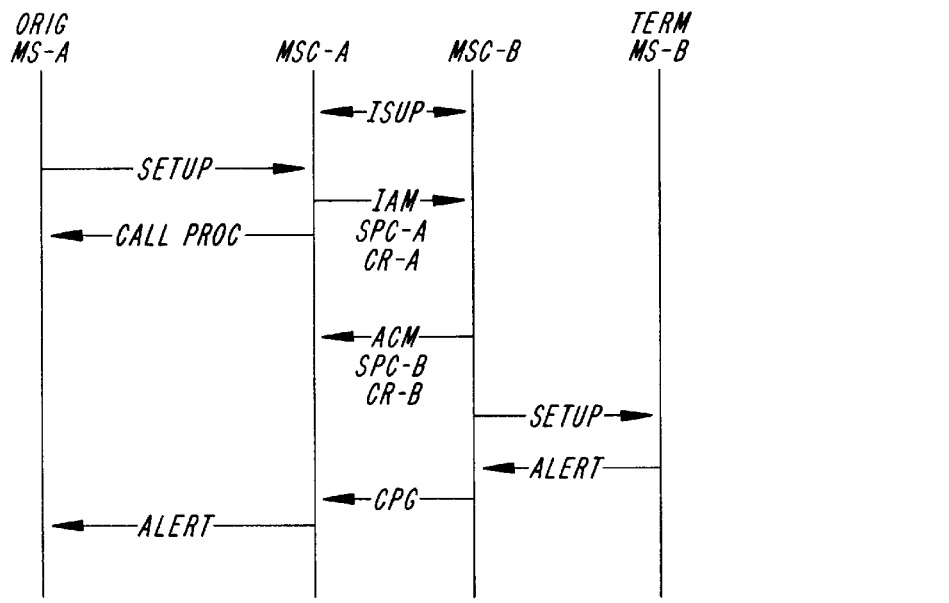
FIG. 5 depicts network messaging sequences in the case of call forwarding.
Figure 5:
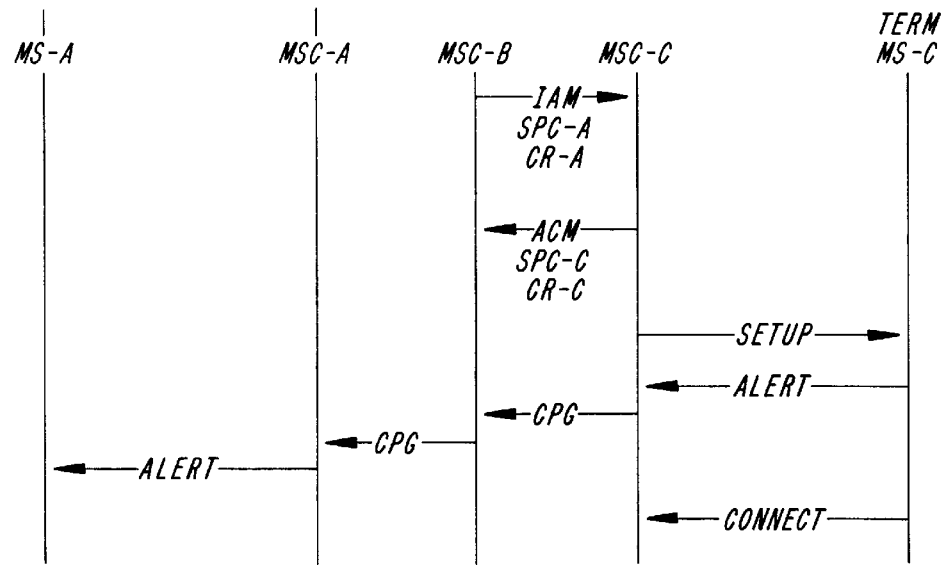
Figure 5:
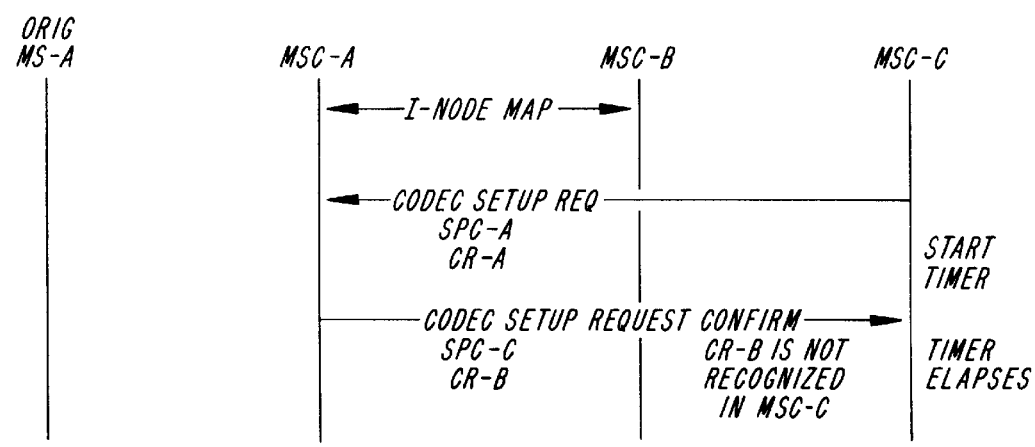
Figures 6, 7:
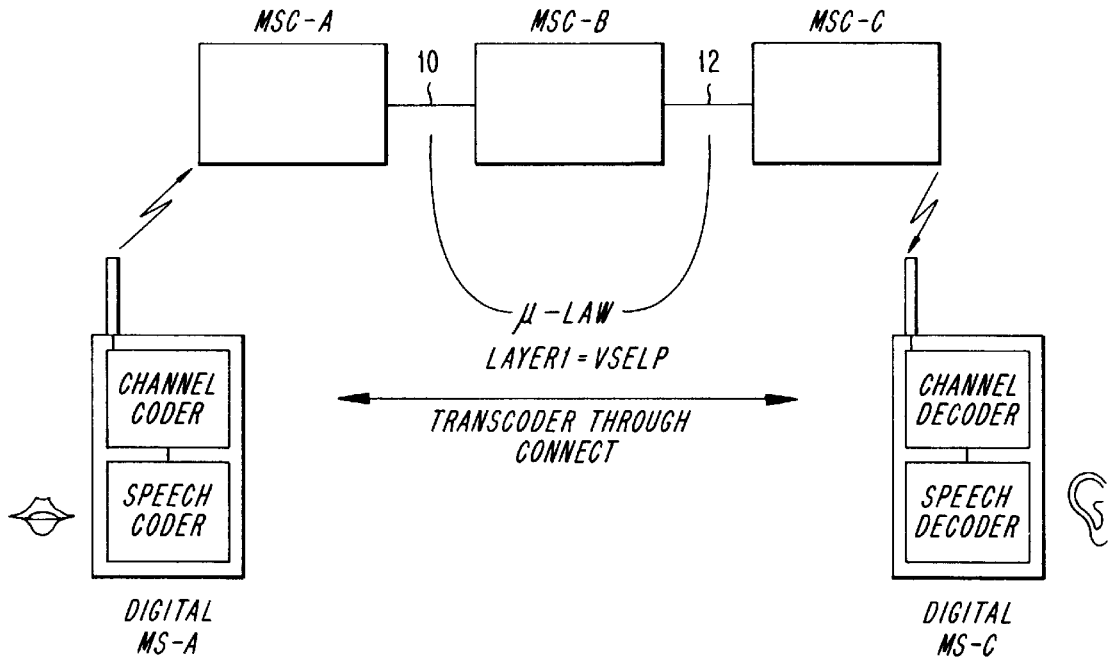
FIG. 6 illustrates a call-forwarding supplementary service in a mobile communications network according to Applicant's invention.
FIG. 7 illustrates a calling party parameter number field modified to include an "MSC address" information element.

As illustrated by FIG. 6, Applicant's invention provides for VSELP or CELP data passing through the connection 10, as Layer 1 data, as before, but this information is not decoded in the MSC-A. Instead, a "codec-through connect" mode is established throughout the network for the call, so that VSELP or CELP data passes through the connection 12, as Layer 1 data, to the MSC-C, which simply forwards the information to the MS-C. One result is avoidance of the extra decoding/coding that reduces speech quality.

When call forwarding is activated between digital MSs in a digital cellular network like the PDC system, the call that is forwarded to the MSC-C by the MSC-B is handled as an independent call from the MSC-A. Thus, the network or exchange that forwarded the call (e.g., MSC-B) to the third party (e.g., MSC-C) must perform appropriate processing so that the signals attributed to the forwarded call affect the originating party in a way such that the originating network does not need to recognize that call forwarding has been activated.

Network identity is one part of the required processing that a network must perform during a call forwarding operation. To provide accurate recognition of the network identity of an originating MSC-A during a call forwarding operation, data which is used to address the MSC-A from the answering mobile subscriber MS-C is clearly separated from other data. That is, the "Charge Area" information element in IAM is not used for addressing the MSC-A. Instead, a new information element called "MSC address", which contains the network code of the MSC-A, is added in the ISUP IAM.

An illustration of part of the format of ISUP IAM is the calling party parameter number field shown in FIG. 1–9/JJ-70.10 of Appendix I of the ISUP. This field is modified as shown in FIG. 7 to include the "MSC address" information element. The "MSC address" is not changed during call setup in the network, even though call forwarding is invoked. Thus, the address of the MSC-A can always be accurately retrieved, and call setup will be successful.

Another part of the processing that a network must perform during a call forwarding operation is call referencing of the terminating MSC by the originating MSC. The problem in the conventional call referencing processes for call forwarding noted above is that the CR of the terminating MSC is sent to the originating MSC via ISUP in the ACM message. The ACM is sent to the originating MSC-A prior to call forwarding, so the "terminating" MSC according to the ACM message is not the forwarded-to MSC-C but rather the forwarding MSC-B. Thus, the ACM message does not always indicate the MSC-C, where the forwarded-to MS-C answers.

The problems of call referencing are solved by not sending the CR via ISUP from the terminating MSC-B to the originating MSC-A in the ACM message. Instead, TCAP services are used. One feature of the TCAP, which provides a wide variety of applications for the transfer of information between nodes in a cellular network, is dialog handling, in which two users can exchange much information. A TCAP dialog can be either structured or unstructured. An unstructured dialog, which does not require a reply from a user, is conventionally used for network control. A structured TCAP dialog, which requires a reply from a user or replies to a user, is preferable for the "Codec-thru control" MAP procedures in a network.

The TCAP includes operations of four different classes, the attributes of which are shown in Table I below.

TABLE I

| CLASS | DESCRIPTION |
| --- | --- |
| 1 | return message is always sent indicating the transmission result |
| 2 | return message is only sent if an error occurred during the transmission |
| 3 | return message is only sent if the transmission was free from errors |
| 4 | no return message is sent |

A TCAP Class 4 operation is conventionally used for "codec setup request", and is defined according to Table II. Using a TCAP Class 4 operation, a "codec setup request" is sent by the terminating MSC-B to the originating MSC-A, but no return result is sent from the originating MSC-A back to the terminating MSC.

TABLE II

CLASS 4 CODEC SETUP REQUEST CODING

| Codec setup request | Timer = 0 | Class = 4 | Tag Code = 01001001 |
| --- | --- | --- | --- |
| Parameters contained in INVOKE | | O/M | |
| IICR | | M | |
| Codec status | | M | |
| Linked operation Null | | | |

The conventional codec setup acknowledge message is defined according to Table III.

TABLE III

CLASS 4 CODEC SETUP CONFIRM CODING

| Codec setup request | Timer = 0 | Class = 4 | Tag Code = 01001010 |
| --- | --- | --- | --- |
| Parameters contained in INVOKE | | O/M | |
| IICR | | M | |
| OK/NG | | M | |
| Linked operation Null | | | |

Instead, in accordance with one aspect of Applicant's invention, a TCAP Class 1 operation is used for "codec setup request". Thus, a return result from the originating MSC-A, acknowledging the "codec setup request", is always sent to the correct terminating MSC as provided by the normal TCAP features. Using a TCAP structured dialog, the originating MSC-A can also respond with a reject component, if desired.

The "codec setup request" operation according to this invention is defined according to Table IV, using the current I-node specification.

TABLE IV

CLASS 1 CODEC SETUP REQUEST CODING

| Codec setup request | Timer = 0 | Class = 4 | Code = 01001001 |
| --- | --- | --- | --- |
| Parameters contained in INVOKE | | O/M | |
| IICR | | M | |
| Codec status | | M | |
| Parameters contained in RETURN RESULT Null | | O/M | |
| Linked operation Null | | | |
| Error CodecFailure | | | |

As an alternative to using a structured TCAP procedure, as described in Table IV, i.e. using an unstructured dialog, a field can be added to each of the Class 4 "codec setup request" and "codec setup request confirm" (codec setup acknowledge) messages of TTC JJ 70.10 Ver. 3. The added fields might be called "CI", for "call identity", as shown in Table V for the "codec setup request" message, and would be the call reference allocated by the MSC-C (the actual terminating MSC).

TABLE V

MODIFIED CLASS 4 CODEC SETUP REQUEST CODING

| Codec setup request | Timer = 0 | Class = 4 | Tag Code = 01001001 |
| --- | --- | --- | --- |
| Parameters contained in INVOKE | | O/M | |
| IICR | | M | |
| Codec status | | M | |
| Call identity | | M | |
| Linked operation Null | | | |

Adding the CI fields, which would conveniently have the same format as the IICR fields, enables the use of Class 4 operations, but the originator of the operation automatically receives an answer whether the operation was successful. A correct call reference would always be returned to the originator. Adding the CI fields fulfills the objectives of class 4, identifying the call initially and staying unchanged.

In accordance with an alternative aspect of Applicant's invention, the "codec setup request" is defined using Abstract Syntax Notation 1 (ASN. 1), which is a language for describing structured information that is recommended by the International Telegraph & Telephone Consultative Committee (CCITT). The "codec setup request" in ASN. 1 notation is shown below:

| ASN.1 Formal Description | |
|---|---|
| CodecSetupRequest ::= | OPERATION PARAMETER |
| callReference | CallReference |
| codecStatus | CodecStatus |
| RESULT ERRORS | CodecFailure |

The CR and SPC information elements that are conventionally sent in the ACM message can be deleted from the ACM message, since these information elements are exchanged using other messages. This frees space in the ACM message for additional information.

Applicant's invention, as described above, enables call forwarding to be supported in a PDC-standard network, while providing better speech quality by avoiding unnecessary speech decoding when a call is forwarded from one network or exchange to another. A new information element called "MSC address" that contains the network code of an originating MSC is added in the ISUP IAM, so that the address of the originating MSC can be properly determined by a terminating MSC or, if call forwarding has been initiated, by a forwarded-to MSC that receives calls forwarded from the terminating MSC. A TCAP Class 1 structured dialog is used for the "codec setup request" operation, so that a return result signal acknowledging the "codec setup request" is sent to the correct receiver, in the terminating MSC or, if call forwarding has been initiated, in the forwarded-to MSC.

It will be understood that Applicant's invention is not limited to the particular embodiments that have been described and illustrated. I.e. the invention could be applied to any digital cellular communication system like e.g. D-AMPS (ADC) or GSM. Of course, the inventive solution could be used for multiple call forwarding like; A–B→C→D, A–B→C→D→E etc. Where "A" represents the originating subscriber roaming in a region served by MSC-A, "B" represents a subscriber roaming in a region served by MSC-B which subscriber "B" has forwarded his calls to an other subscriber "C" roaming in a region served by MSC-C which subscriber "C" in his turn has forwarded his calls to yet an other subscriber "D" roaming in a region served by MSC-D and so on. This application contemplates any and all modifications that fall within the spirit and scope of Applicant's invention as defined by the following claims.

What is claimed is:

1. A method for setting up a call between an originating subscriber roaming in a region served by a first Mobile services Switching Center (MSC) and a terminating subscriber roaming in a region served by a second, the terminating subscriber having forwarded calls to a forwarded-to subscriber roaming in a region served by a third MSC, comprising the steps of:

sending a message to the second MSC from the first MSC, the message identifying a network to which the originating subscriber belongs and a call reference identifying the call in the first MSC;

passing the message to the third MSC serving the region of the forwarded-to subscriber from the second MSC;

p1 sending a request to the first MSC from the third MSC serving the region of the forwarded-to subscriber, the request requesting setup of speech coding and channel coding; and sending a return signal from the first MSC to the third MSC serving the region of the forwarded-to subscriber, the return signal acknowledging the request.

2. The method of claim 1, further including the steps of:

speech coding and channel coding data for transmission from the originating subscriber; and channel decoding and speech decoding data received from the originating subscriber by the terminating subscriber;

wherein the step of channel decoding and speech decoding data is performed only once for the call.

3. The method of claim 1, wherein the steps of sending a request and sending a return signal are performed as a structured TCAP-dialog.

4. The method of claim 1, wherein the steps of sending a request and sending a return signal are performed as unstructured TCAP-dialogs.

5. The method of claim 4, wherein in each of the unstructured TCAP-dialogs for requesting and sending a return signal a field is included, which field indicates the identity of the call.

6. An apparatus for setting up a call between an originating subscriber roaming in a region served by a first Mobile services Switching Center (MSC) and a terminating subscriber roaming in a region served by a second MSC, the terminating subscriber having forwarded calls to a forwarded-to subscriber roaming in a region served by a third MSC, comprising:

means for sending a message to the second MSC from the first MSC, the message identifying a network to which the originating subscriber belongs and a call reference identifying the call in the first MSC;

means for passing the message to the third MSC serving the region of the forwarded-to subscriber from the second MSC;

means for sending a request to the first MSC from the third MSC serving the region of the forwarded-to subscriber, the request requesting setup of speech coding and channel coding; and means for sending a return signal from the first MSC to the third MSC serving the region of the forwarded-to subscriber, the return signal acknowledging the request.

7. The apparatus of claim 6, wherein the request sending means and the return signal sending means carry out a structured TCAP-dialog.

8. The apparatus of claim 6, wherein the request sending means and the return signal sending means carry out unstructured TCAP-dialogs.

9. The apparatus of claim 8, wherein the unstructured TCAP-dialogs carried out by the request sending means and the return signal sending means include a field which indicates the identity of the call.

* * * * *